United States Patent
Wan et al.

(10) Patent No.: US 12,177,491 B2
(45) Date of Patent: Dec. 24, 2024

(54) LOOP FILTER IMPLEMENTATION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Shuai Wan, Guangdong (CN); Mingze Wang, Guangdong (CN); Yanzhuo Ma, Guangdong (CN); Junyan Huo, Guangdong (CN); Fuzheng Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 212 days.

(21) Appl. No.: 17/468,477

(22) Filed: Sep. 7, 2021

(65) Prior Publication Data
US 2021/0409783 A1 Dec. 30, 2021

Related U.S. Application Data

(63) Continuation of application No. PCT/CN2019/077371, filed on Mar. 7, 2019.

(51) Int. Cl.
*H04N 19/82* (2014.01)
*H04N 19/119* (2014.01)
(Continued)

(52) U.S. Cl.
CPC ........... *H04N 19/82* (2014.11); *H04N 19/119* (2014.11); *H04N 19/176* (2014.11); *H04N 19/186* (2014.11)

(58) Field of Classification Search
CPC .. H04N 19/117; H04N 19/119; H04N 19/124; H04N 19/139; H04N 19/176; H04N 19/186; H04N 19/59; H04N 19/82
See application file for complete search history.

(56) References Cited

U.S. PATENT DOCUMENTS

| 2004/0034611 | A1* | 2/2004 | Kee | G06F 18/2431 |
| | | | | 382/118 |
| 2010/0329361 | A1* | 12/2010 | Choi | H04N 19/176 |
| | | | | 375/E7.193 |

(Continued)

FOREIGN PATENT DOCUMENTS

| CN | 1816149 A | 8/2006 |
| CN | 102857746 A | 1/2013 |

(Continued)

OTHER PUBLICATIONS

First Office Action of the European application No. 19917600.9, issued on Aug. 26, 2022. 5 pages.

(Continued)

*Primary Examiner* — Md N Haque
(74) *Attorney, Agent, or Firm* — PERKINS COIE LLP

(57) ABSTRACT

Provided are a method and apparatus for in-loop filtering and a computer storage medium. The method includes that: a picture to be filtered is acquired, the picture to be filtered being generated in a video coding process of an original picture in a video to be coded, the video to be coded including at least one original picture and the at least one original picture including the original picture; fused information of the picture to be filtered is determined, the fused information being obtained by fusing at least two colour components of the picture to be filtered and corresponding auxiliary information; and in-loop filtering is performed on the picture to be filtered based on the fused information to (Continued)

---

A picture to be filtered is acquired, the picture to be filtered being generated in a video coding process of an original picture in a video to be coded, the video to be coded including at least one original picture and the at least one original picture including the original picture — S301

↓

Fused information of the picture to be filtered is determined, the fused information being obtained by fusing at least two colour components of the picture to be filtered and corresponding auxiliary information — S302

↓

In-loop filtering is performed on the picture to be filtered based on the fused information to obtain at least one colour component of the picture subjected to the in-loop filtering — S303 obtain at least one colour component of the picture subjected to the in-loop filtering.

14 Claims, 11 Drawing Sheets

(51) Int. Cl.
　　*H04N 19/176*　　(2014.01)
　　*H04N 19/186*　　(2014.01)

(56) References Cited

U.S. PATENT DOCUMENTS

| | | | | |
|---|---|---|---|---|
| 2011/0317073 | A1* | 12/2011 | Chang | H04N 19/132 348/642 |
| 2013/0215959 | A1* | 8/2013 | Chen | H04N 19/117 375/240.02 |
| 2020/0213587 | A1* | 7/2020 | Galpin | H04N 19/117 |

FOREIGN PATENT DOCUMENTS

| | | |
|---|---|---|
| CN | 103220529 A | 7/2013 |
| CN | 104735450 A | 6/2015 |
| CN | 108134932 A | 6/2018 |
| CN | 108184129 A | 6/2018 |
| CN | 109120937 A | 1/2019 |
| EP | 3451670 A1 | 3/2019 |
| WO | 2017222140 A1 | 12/2017 |
| WO | 2019031410 A1 | 2/2019 |

OTHER PUBLICATIONS

First Office Action of the Chinese application No. 202110832617.X, issued on Nov. 14, 2022. 20 pages with English translation.

Kang Jihong et al: "Multi-modal/multi-scale convolutional neural network based in-loop filter design for next generation video codec", 2017 IEEE International Conference on Image Processing (ICIP), IEEE, (Sep. 17, 2017) pp. 26-30.

Office Action of the Indian application No. 202117043565, issued on Mar. 17, 2022. 7 pages with English translation.

Supplementary European Search Report in the European application No. 19917600.9, mailed on Mar. 1, 2022. 6 pages.

Zhou (Hikvision) L et al: "Convolutional Neural Network Filter (CNNF) for intra frame", 9. JVET Meeting; 20180120-20180126; Gwangju; JVET ISO/IEC JTC1/SC29/WG11 and ITU-T SG.16, No. JVET-I0022 Jan. 24, 2018 (Jan. 24, 2018), XP030248070. 9 pages.

International Search Report in the international application No. PCT/CN2019/077371, mailed on Dec. 11, 2019.

Written Opinion of the International Search Authority in the international application No. PCT/CN2019/077371, mailed on Dec. 11, 2019.

Park W S, Kim M. CNN-based in-loop filtering for coding efficiency improvement[C]/ 2016 IEEE 12th Image, Video, and Multidimensional Signal Processing Workshop (IVMSP). IEEE, 2016.

Dai Y, Liu D, Wu F. A Convolutional Neural Network Approach for Post-Processing in HEVC Intra Coding[J]. 2017.

S. Kuanar, C. Conly and K. R. Rao, "Deep Learning Based HEVC In-Loop Filtering for Decoder Quality Enhancement", 2018 Picture Coding Symposium (PCS), San Francisco, CA, 2018, pp. 164-168.

Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0383; Title: AHG9: Convolution Neural Network Filter.

Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0351; Title: AHG9: Convolutional Neural Network Filter (CNNF) for Intra Frame.

Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0159-v1; Title: AHG9: Convolutional neural network loop filter.

Joint Video Experts Team (JVET) of ITU-T SG 16 WP 3 and ISO/IEC JTC 1/SC 29/WG 11, 13th Meeting: Marrakesh, Jan. 2019, Document: JVET-M0566; Title: AHG9: Adaptive convolutional neural network loop filter.

Notice of Oral Examination of the European application No. 19917600.9, issued on Feb. 23, 2023. 5 pages with English translation.

First Office Action of the Japanese application No. 2021-552876, issued on Apr. 21, 2023. 15 pages with English translation. .

Second Office Action of the Chinese application No. 202110832617.X, issued on Apr. 27, 2023. 18 pages with English translation. .

Wei Xiaojun, Zhang Gang, Optimization and Implementation of Loop Filter in AVS Decoder, Television technology, Mar. 2, 2013. The whole document. 7 pages with English translation.

Chaofan Wu, Research and Hardware Design of High-throughput In-Loop Filters in HEVC, Chinese Master excellent Thesis Electronic Journal, Dec. 18, 2018. The whole document. 88 pages with English translation.

Adireddy Ramakrishna, SAO filtering inside CTU loop for high efficiency video coding, 2013 SIGMIP, Aug. 13, 2015. The whole document. 4 pages.

Notice of Allowance of the Chinese application No. 202110832617.X, issued on Jun. 15, 2023. 5 pages with English translation.

Notice of Maintain the Oral Proceedings of the European application No. 19917600.9, issued on Jun. 21, 2023. 6 pages.

Reject Decision of the European application No. 19917600.9, issued on Jul. 13, 2023. 10 pages.

First Office Action of the Indonesian application No. P00202108345, issued on Aug. 31, 2023, 5 pages with English translation.

\* cited by examiner

LOOP FILTER IMPLEMENTATION METHOD AND APPARATUS, AND COMPUTER STORAGE MEDIUM

CROSS-REFERENCE TO RELATED APPLICATION

This is a continuation application of International Patent Application No. PCT/CN2019/077371 filed on Mar. 7, 2019, the content of which is incorporated herein by reference in its entirety.

TECHNICAL FIELD

Embodiments of the disclosure relate to the technical field of picture processing, and particularly to a method and apparatus for in-loop filtering and a computer storage medium.

BACKGROUND

In a video coding and decoding system, a block Coding Unit (CU)-based hybrid coding framework is mostly adopted for video coding. Different coding parameters such as different transformation processes, different Quantization Parameters (QPs), different prediction manners and different reference pictures are adopted for adjacent CUs, and error magnitudes introduced by the CUs and distribution characteristics thereof are mutually independent, so that a blocking effect is generated by the discontinuity of boundaries of adjacent CUs, bringing influences to the subjective and objective quality of a reconstructed picture and even to the prediction accuracy of subsequent coding and decoding.

Therefore, in a coding and decoding process, an in-loop filter is adopted to improve the subjective and objective quality of a reconstructed picture. Conventional in-loop filters usually sum up features of distorted pictures manually, and designing of filter structures and configuration of filter coefficients are implemented manually. Filters dependent on manual designing, such as De-Blocking Filter (DBF), Sample Adaptive Offset (SAO) and Adaptive Loop Filter (ALF), are not fitted well to optimal filters, because adaptive capabilities and filtering effects are relatively poor and a filter related parameter depending on local statistical information is needed to be signalled into a bitstream by a coder to ensure consistency of the coder and a decoder, which increases the number of bits for coding.

With the rapid development of deep learning, it has been proposed in the industry to perform filter processing on a reconstructed picture through a Convolutional Neural Network (CNN) to eliminate a picture distortion, which, compared with a conventional in-loop filter, obviously improves the subjective and objective picture quality. However, a present CNN filter does not utilize related information fully and comprehensively, and consequently, improvements in the subjective and objective quality of a reconstructed picture are limited.

SUMMARY

According to a first aspect, the embodiments of the disclosure provide a method for in-loop filtering, which may include: acquiring a picture to be filtered, the picture to be filtered being generated in a process of coding an original picture in a video to be coded; determining fused information of the picture to be filtered, the fused information comprising at least two colour components of the picture to be filtered; and acquiring an in-loop filtering output of the picture to be filtered based on the fused information, the in-loop filtering output including at least one colour component.

According to a second aspect, the embodiments of the disclosure provide an apparatus for in-loop filtering, which may include a memory and a processor. The memory is configured to store a computer program capable of running in the processor. The processor is configured to: acquire a picture to be filtered, the picture to be filtered being generated in a process of coding an original picture in a video to be coded; determine fused information of the picture to be filtered, the fused information including at least two colour components of the picture to be filtered; and acquire an in-loop filtering output of the picture to be filtered based on the fused information, the in-loop filtering output including at least one colour component.

According to a third aspect, the embodiments of the disclosure provide a method for in-loop filtering, which may include: decoding a bitstream to determine a picture to be filtered; determining fused information of the picture to be filtered, the fused information including at least two colour components of the picture to be filtered; and acquiring an in-loop filtering output of the picture to be filtered based on the fused information, the in-loop filtering output including at least one colour component.

According to a fourth aspect, the embodiments of the disclosure provide an apparatus for in-loop filtering, which may include a memory and a processor. The memory is configured to store a computer program capable of running in the processor. The processor is configured to: decode a bitstream to determine a picture to be filtered; determine fused information of the picture to be filtered, the fused information comprising at least two colour components of the picture to be filtered; and acquire an in-loop filtering output of the picture to be filtered based on the fused information, the in-loop filtering output including at least one colour component.

The embodiments of the disclosure provide the method and apparatus for in-loop filtering and the computer storage medium. First, a picture to be filtered may be acquired, the picture to be filtered being generated in a video coding process of an original picture in a video to be coded. Then, fused information of the picture to be filtered may be determined, the fused information being obtained by fusing at least two colour components of the picture to be filtered and corresponding auxiliary information. Finally, in-loop filtering may be performed on the picture to be filtered based on the fused information to obtain at least one filtered colour component of the picture subjected to the in-loop filtering. In such a manner, a coding parameter, such as block partitioning information and/or QP information, may be used as auxiliary information to fuse with multiple input colour components, so that not only a relationship between the multiple colour components is fully utilized, but also complete network forward calculation for the multiple colour components is effectively avoided and the calculation complexity and the coding rate are reduced. In addition, the auxiliary information such as block partitioning information and/or QP information is fused, so that filtering can further be assisted, and the subjective and objective quality of a reconstructed picture in a video coding and decoding process is improved.

BRIEF DESCRIPTION OF THE DRAWINGS

FIG. 4 is a structure diagram of a block partitioning matrix according to an embodiment of the disclosure.

DETAILED DESCRIPTION

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

In a video coding and decoding system, a video to be coded includes at least one original picture, and the at least one original picture includes an original picture. Multiple types of processing, such as prediction, transformation, quantization, reconstruction and filtering, may be performed on the original picture. In these processing processes, a processed video picture may have a pixel value offset relative to the original picture, resulting in a visual disturbance or an artifact. In addition, in a block-CU-based hybrid coding framework adopted for most video coding and decoding systems, different coding parameters (for example, different transformation processes, different QPs, different prediction manners and different reference pictures) are adopted for adjacent Coding Blocks (CBs), and error magnitudes introduced by the CBs and distribution characteristics thereof are mutually independent, so that a blocking effect is generated by the discontinuity of boundaries of adjacent CBs. These distortions not only affect the subjective and objective quality of a reconstructed picture, but also may affect the prediction accuracy of subsequent coding and decoding and further affect the number of bits in a video bitstream if the reconstructed picture is taken as a reference picture for subsequent pixel coding. Therefore, an in-loop filter may usually be added to a video coding and decoding system to improve the subjective and objective quality of a reconstructed picture.

Figure 1:
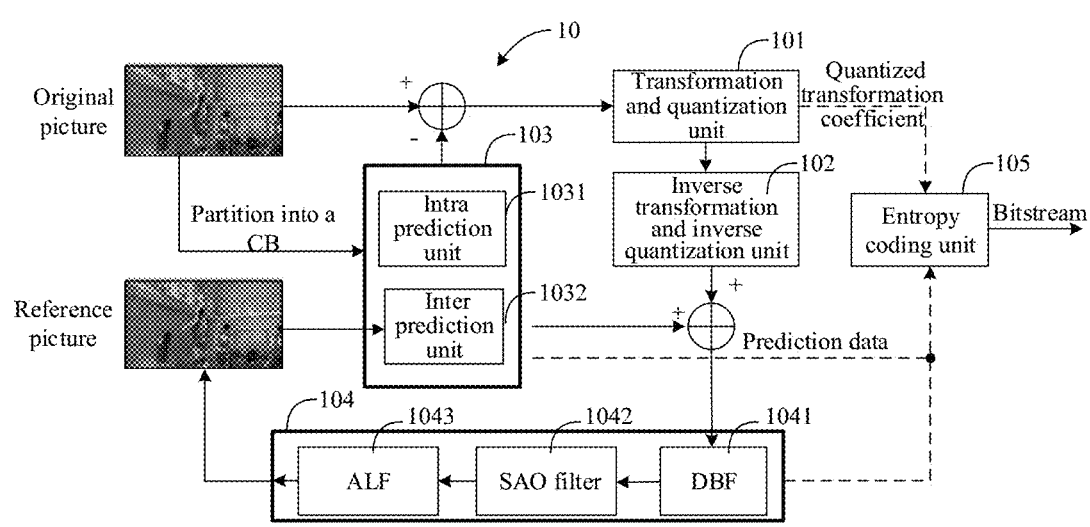
FIG. 1 is a composition structure diagram of a conventional coding block diagram according to a related technical solution.

Referring to FIG. 1, a composition structure diagram of a conventional coding block diagram 10 according to a related technical solution is shown. As shown in FIG. 1, the conventional coding block diagram 10 may include components such as a transformation and quantization unit 101, an inverse transformation and inverse quantization unit 102, a prediction unit 103, a filtering unit 104 and an entropy coding unit 105. The prediction unit 103 further includes an intra prediction unit 1031 and an inter prediction unit 1032. For an input original picture, a Coding Tree Unit (CTU) may be obtained by preliminary partitioning, and content adaptive partitioning may be continued to be performed on the CTU to obtain a CU. The CU usually includes one or more CBs. Residual information may be obtained by intra prediction performed by the intra prediction unit 1031 or inter prediction performed by the inter prediction unit 1032 over the CB. The residual information may be processed through the transformation and quantization unit 101 to transform the CB, including transforming the residual information from a pixel domain to a transformation domain and quantizing an obtained transformation coefficient, to further reduce a bit rate. After a prediction mode is determined, the prediction unit 103 is further configured to provide selected intra prediction data or inter prediction data for the entropy coding unit 105. In addition, the inverse transformation and inverse quantization unit 102 is configured to reconstruct the CB, namely a residual block is reconstructed in the pixel domain, an artifact with a blocking effect in the reconstructed residual block is removed through the filter 104 and then the reconstructed residual block is added to a decoded picture buffer to generate a reconstructed reference picture. The entropy coding unit 105 is configured to code various coding parameters and quantized transformation coefficients. For example, the entropy coding unit 105 may adopt header information coding and Context-based Adaptive Binary Arithmetic Coding (CABAC) algorithms, and may be configured to code coding information indicating the determined prediction mode and output a corresponding bitstream.

For the conventional coding block diagram 10 shown in FIG. 1, the filtering unit 104 is a loop filter, also called an in-loop filter, and may include a De-Blocking Filter (DBF) 1041, an SAO filter 1042 and an Adaptive Loop Filter (ALF) 1043, etc. The DBF 1041 is configured to implement de-blocking filtering. In a next-generation video coding standard H.266/Versatile Video Coding (VVC), for a boundary of each CB in an original picture, boundary strength is determined according to coding parameters on two sides of the boundary at first, a filtering decision of whether to perform de-blocking or not is made according to a calculated block boundary texture value, and finally, correction is performed on pixel information on the two sides of the boundary of the CB according to the boundary strength and the filtering decision. In VVC, after de-blocking filtering is executed, an SAO technology, i.e., the SAO filter 1042, is further introduced for reducing a quantization distortion of a high-frequency alternating-current coefficient. Furthermore, compensation processing is performed from the pixel domain by adding a negative value to a pixel at a peak and adding a positive value to a pixel at a valley. In VVC, after de-blocking filtering and SAO filtering are executed, further filtering may be performed by use of the ALF 1043. For adaptive loop filtering, a mean square optimal filter is calculated based on a pixel value of the original picture and a pixel value of a distorted picture. However, these filters (for example, the DBF 1041, the SAO filter 1042 and the ALF 1043) require precise manual designing and a lot of decisions. In addition, a filter related parameter depending on local statistical information (for example, a filter coefficient and a flag value indicating whether to select the filter or not) is needed to be signalled into a bitstream by a coder to ensure consistency between the coder and a decoder, which increases the number of coding bits. Moreover, a fitting degree of a manually designed filter for a complex function of a real optimization target is not so high, and a filtering effect needs to be enhanced.

The embodiments of the disclosure provide a method for in-loop filtering. The method is applied to an improved coding block diagram. Compared with the conventional coding block diagram 10 shown in FIG. 1, the main difference is that an improved in-loop filter is adopted instead of the DBF 1041, SAO filter 1042 and ALF 1043, etc. in the related technical solution. In the embodiments of the disclosure, the improved in-loop filter may be a CNN filter or may also be another filter constructed by deep learning. No specific limits are made in the embodiments of the disclosure.

Figure 2:
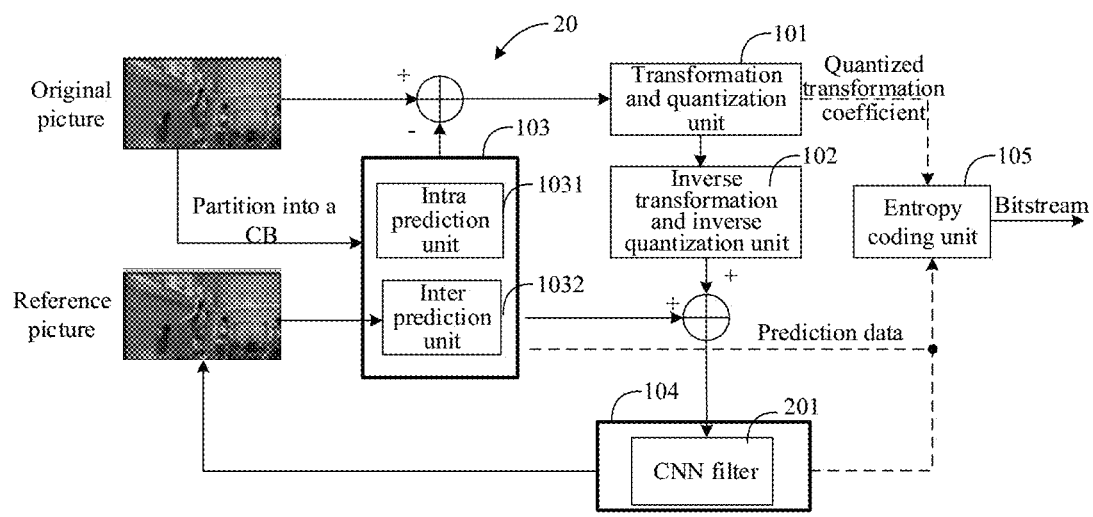
FIG. 2 is a composition structure diagram of an improved coding block diagram according to an embodiment of the disclosure.

A CNN filter is taken as an example. Referring to FIG. 2, a composition structure diagram of an improved coding block diagram 20 according to an embodiment of the disclosure is shown. As shown in FIG. 2, compared with the conventional coding block diagram 10, a filtering unit 104 in the improved coding block diagram 20 includes a CNN filter 201. The CNN filter 201 may completely replace the DBF 1041, SAO filter 1042 and ALF 1043 in FIG. 1, may also partially replace any one or two of the DBF 1041, SAO filter 1042 and ALF 1043 in FIG. 1, and may even be combined with any one or more of the DBF 1041, SAO filter 1042 and ALF 1043 in FIG. 1. It is also to be noted that, for each component shown in FIG. 1 or FIG. 2, for example, the transformation and quantization unit 101, the inverse transformation and inverse quantization unit 102, the prediction unit 103, the filtering unit 104, the entropy coding unit 105 or the CNN filter 201, the component may be a virtual module or may also be a hardware module. In addition, it can be understood by those skilled in the art that these units are not intended to limit the coding block diagram and the coding block diagram may include components more or fewer than those shown in the figure or some components are combined or different component arrangements are adopted.

In the embodiments of the disclosure, the CNN filter 201 may be directly deployed at a coder and a decoder after filter network training, and in such a case, no filter related parameter is needed to be transmitted. The CNN filter 201 may also fuse multiple input colour components and auxiliary information such as block partitioning information and/or QP information, so that not only a relationship between the multiple colour components is fully utilized, but also the calculation complexity the coding rate are reduced, and in addition, the subjective and objective quality of a reconstructed picture in a video coding and decoding process is further improved.

It is to be noted that the method for in-loop filtering of the embodiments of the disclosure may be applied not only to a coding system but also to a decoding system. Generally, for reducing the coding rate and simultaneously ensuring correct decoding processing of the decoding system, in-loop filters of the embodiments of the disclosure are required to be deployed in both the coding system and the decoding system. Detailed descriptions will be made below with application to the coding system as an example.

Figure 3:
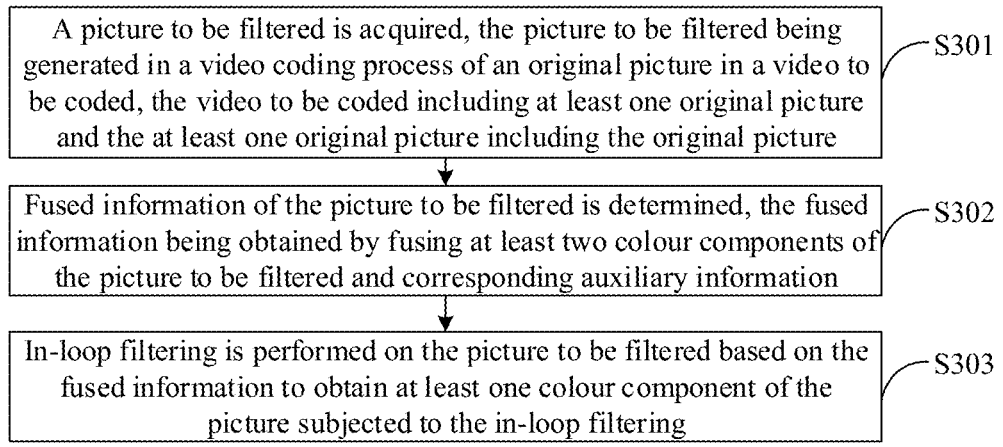
FIG. 3 is a flowchart of a method for in-loop filtering according to an embodiment of the disclosure.

Referring to FIG. 3, a flowchart of a method for in-loop filtering according to an embodiment of the disclosure is shown. The method may include the following steps.

In S301, a picture to be filtered is acquired, the picture to be filtered being generated in a video coding process of an original picture in a video to be coded, the video to be coded including at least one original picture and the at least one original picture including the original picture.

In S302, fused information of the picture to be filtered is determined, the fused information being obtained by fusing at least two colour components of the picture to be filtered and corresponding auxiliary information.

In S303, in-loop filtering is performed on the picture to be filtered based on the fused information to obtain at least one colour component of the picture subjected to the in-loop filtering.

It is to be noted that, the original picture may be partitioned into CTUs or the CTUs may be partitioned into CUs, namely block partitioning information in the embodiment of the disclosure may refer to CTU partitioning information or may also refer to CU partitioning information. The method for in-loop filtering of the embodiment of the disclosure may be applied not only to CU-level in-loop filtering but also to CTU-level in-loop filtering. No specific limits are made in the embodiment of the disclosure.

In the embodiment of the disclosure, a picture to be filtered is acquired, the picture to be filtered being generated in a video coding process of an original picture in a video to be coded, the video to be coded including at least one original picture and the at least one original picture including the original picture; and fused information of the picture to be filtered is determined, the fused information being obtained by fusing at least two colour components of the picture to be filtered and corresponding auxiliary information, so that not only a relationship between multiple colour components is fully utilized, but also complete network forward calculation required to be performed for the multiple colour components is effectively avoided, the calculation complexity and the coding rate are reduced. Finally, in-loop filtering is performed on the picture to be filtered based on the fused information to obtain at least one filtered colour component of the picture subjected to the in-loop filtering. The fused information includes auxiliary information such as block partitioning information and/or QP information, so that filtering may further be assisted, and the subjective and objective quality of a reconstructed picture in a video coding and decoding process is improved.

In some embodiments, the colour component may include a first colour component, a second colour component and a third colour component. The first colour component represents a luma component, the second colour component represents a first chroma component, and the third colour component represents a second chroma component.

It is to be noted that, in a video picture, the first colour component, the second colour component and the third colour component are usually adopted to represent an original picture or a picture to be filtered. In a luma-chroma component representation method, the three colour components include a luma component, a blue chroma (chromatism) component and a red chroma (chromatism) component respectively. Specifically, the luma component is usually represented by a sign Y, the blue chroma component is usually represented by a sign Cb or U, and the red chroma component is usually represented by a sign Cr or V. In the embodiment of the disclosure, the first colour component may be the luma component Y, the second colour component may be the blue chroma component U, and the third colour component may be the red chroma component V. However, no specific limits are made in the embodiment of the disclosure. The at least one colour component represents one or more of the first colour component, the second colour component and the third colour component. The at least two colour components may be the first colour component, the second colour component and the third colour component, or may also be the first colour component and the second colour component, or may also be the first colour component and the third colour component, or may be the second colour component and the third colour component. No specific limits are made in the embodiment of the disclosure.

In VVC, a corresponding test model is a VVC Test Model (VTM). When a test is made through the VTM, a present standard test sequence adopts a 4:2:0 YUV format. Each picture in a video to be coded in this format may consist of three colour components: a luma component (represented by Y) and two chroma components (represented by U and V). When a height of an original picture in the video to be coded is H and a width is W, size information corresponding to the first colour component is H×W, and size information corresponding to the second colour component or the third colour component is $$\frac{H}{2} \times \frac{W}{2}.$$

It is to be noted that, in the embodiment of the disclosure, the descriptions will be made below with the 4:2:0 YUV format as an example. However, the method for in-loop filtering of the embodiment of the disclosure is also applied to other sampling formats.

The 4:2:0 YUV format is taken as an example. Since the size information of the first colour component is different from the size information of the second colour component or the third colour component, for inputting the first colour component and/or the second colour component and/or the third colour component into an improved in-loop filter at one time, the three colour components are required to be sampled or recombined to ensure that space-domain size information of the three colour components is the same.

In some embodiments, pixel rearrangement processing (which may also be called down-sampling processing) may be performed on a high-resolution colour component to ensure that the space-domain size information of the three colour components is the same. Specifically, before the at least two colour components of the picture to be filtered are fused with the auxiliary information, the method may further include the following operations.

A high-resolution colour component is selected from the at least two colour components of the picture to be filtered.

Pixel rearrangement is performed on the high-resolution colour component.

It is to be noted that, when the first colour component is the luma component, the second colour component is the first chroma component and the third colour component is the second chroma component, the high-resolution colour component is the first colour component. In such a case, pixel rearrangement is required to be performed on the first colour component. For example, the size of an original picture is 2×2, and the original picture may be converted to four channels, namely a 2×2×1 tensor is arranged into a 1×1×4 tensor. In such case, when the size information of the first colour component of the original picture is H×W before in-loop filtering, the original picture may be converted into a form of $$\frac{H}{2} \times \frac{W}{2} \times 4$$

by pixel rearrangement. Since the size information of both the second colour component and the third colour component is $$\frac{H}{2} \times \frac{W}{2},$$

the space-domain size information of the three colour components may be the same. After the three colour components, i.e., the first colour component subjected to pixel rearrangement, the second colour component and the third picture, are subsequently merged to convert the original picture into a form of $$\frac{H}{2} \times \frac{W}{2} \times 6,$$

the original picture may be input to the improved loop filter.

In some embodiments, up-sampling processing may further be performed on a low-resolution colour component to ensure that the space-domain size information of the three colour components is the same. Specifically, before the at least two colour components of the picture to be filtered are fused with the auxiliary information, the method further includes the following operations.

A low-resolution colour component is selected from the at least two colour components of the picture to be filtered.

Up-sampling processing is performed on the low-resolution colour component.

It is to be noted that, besides performing size-information-based pixel rearrangement (i.e., downward adjustment) on the high-resolution colour component, in the embodiment of the disclosure, up-sampling processing (i.e., upward adjustment) may also be performed on the low-resolution colour component. In addition, for the low-resolution colour component, up-sampling processing may be performed, deconvolution processing may also be performed, and super-resolution processing and the like may even be performed. The same effects can be achieved by the three types of processing. No specific limits are made in the embodiment of the disclosure.

It is also to be noted that, when the first colour component is the luma component, the second colour component is the first chroma component and the third colour component is the second chroma component, the low-resolution colour component is the second colour component or the third colour component, and in such case, up-sampling processing is required to be performed on the second colour component or the third colour component. For example, when the size information of both the second colour component and third colour component of the original picture is $$\frac{H}{2} \times \frac{W}{2},$$

before in-loop filtering, the size information may be converted into a form of H×W by up-sampling processing. Since the size information of the first colour component is H×W, the space-domain size information of the three colour components may be the same. Moreover, the second colour component subjected to up-sampling processing and the third colour component subjected to up-sampling processing are kept consistent with the first colour component in resolution.

In some embodiments, the operation that the picture to be filtered is acquired may include the following operations.

Video coding is performed on the original picture in the video to be coded, and a generated reconstructed picture is determined as the picture to be filtered; or, video coding is performed on the original picture in the video to be coded to generate a reconstructed picture, preset filtering is performed on the reconstructed picture, and the reconstructed picture subjected to the preset filtering is determined as the picture to be filtered.

It is to be noted that, in a process of performing video coding on the original picture in the video to be coded based on the improved coding block diagram 20, when video coding is performed on an original picture, processing such as CU partitioning, prediction and transformation and quantization may be performed on the original picture, and for obtaining a reference picture for subsequent video coding of a picture to be coded, processing such as inverse transformation and inverse quantization, reconstruction and filtering may also be performed. Therefore, the picture to be filtered in the embodiment of the disclosure may be a reconstructed picture generated by reconstruction in the video coding process or may also be a picture obtained by performing preset filtering on the reconstructed picture in another preset filtering manner (for example, a de-blocking filtering method). No specific limits are made in the embodiment of the disclosure.

In some embodiments, before the operation that the fused information of the picture to be filtered is determined, the method may further include the following operation.

The auxiliary information corresponding to the picture to be filtered is determined, the auxiliary information at least including block partitioning information and/or QP information.

It can be understood that the auxiliary information may be configured to assist in filtering to improve the filtering quality. In the embodiment of the disclosure, the auxiliary information may not only be the block partitioning information (for example, the CU partitioning information and/or the CTU partitioning information) but also be the QP information, and may even be Motion Vector (MV) information, prediction direction information and the like. The information may be used as the auxiliary information independently, or may also be freely combined as the auxiliary information. For example, the block partitioning information may be used as the auxiliary information independently, or the block partitioning information and the QP information may be used as the auxiliary information, or the block partitioning information and the MV information may be used as the auxiliary information. No specific limits are made in the embodiment of the disclosure.

It can also be understood that, since an original picture may be partitioned into CTUs or CTUs may be partitioned into CUs, the method for in-loop filtering of the embodiment of the disclosure may be applied not only to CU-level in-loop filtering (in such case, block partitioning information is CU partitioning information) but also to CTU-level in-loop filtering (in such case, block partitioning information is CTU partitioning information). No specific limits are made in the embodiment of the disclosure. Descriptions will be made below with the condition that CU partitioning information is used as block partitioning information as an example.

In some embodiments, the operation that the auxiliary information corresponding to the picture to be filtered is determined may include the following operation.

CU partitioning is performed on the original picture in the video to be coded to obtain CU partitioning information, and the CU partitioning information is determined as the block partitioning information corresponding to the picture to be filtered.

Furthermore, in some embodiments, the operation that the CU partitioning information is determined as the block partitioning information corresponding to the picture to be filtered may include the following operations.

For the CU partitioning information, a first matrix corresponding to the CU partitioning information is obtained by filling each pixel position corresponding to a boundary of a CU with a first value and filling another pixel position with a second value, the first value being different from the second value.

The first matrix is determined as the block partitioning information corresponding to the picture to be filtered.

It is to be noted that the first value may be a preset numerical value, letter, etc., the second value may also be a preset numerical value, letter, etc. and the first value is different from the second value. For example, the first value may be set to be 2, and the second value may be set to be 1. However, no specific limits are made in the embodiment of the disclosure.

In the embodiment of the disclosure, the CU partitioning information may be used as the auxiliary information to assist in filtering processing of the picture to be filtered. That is, in the video coding process of the original picture in the video to be coded, the CU partitioning information may be fully utilized and fused with at least two colour components of the picture to be filtered to guide filtering.

Figure 4:
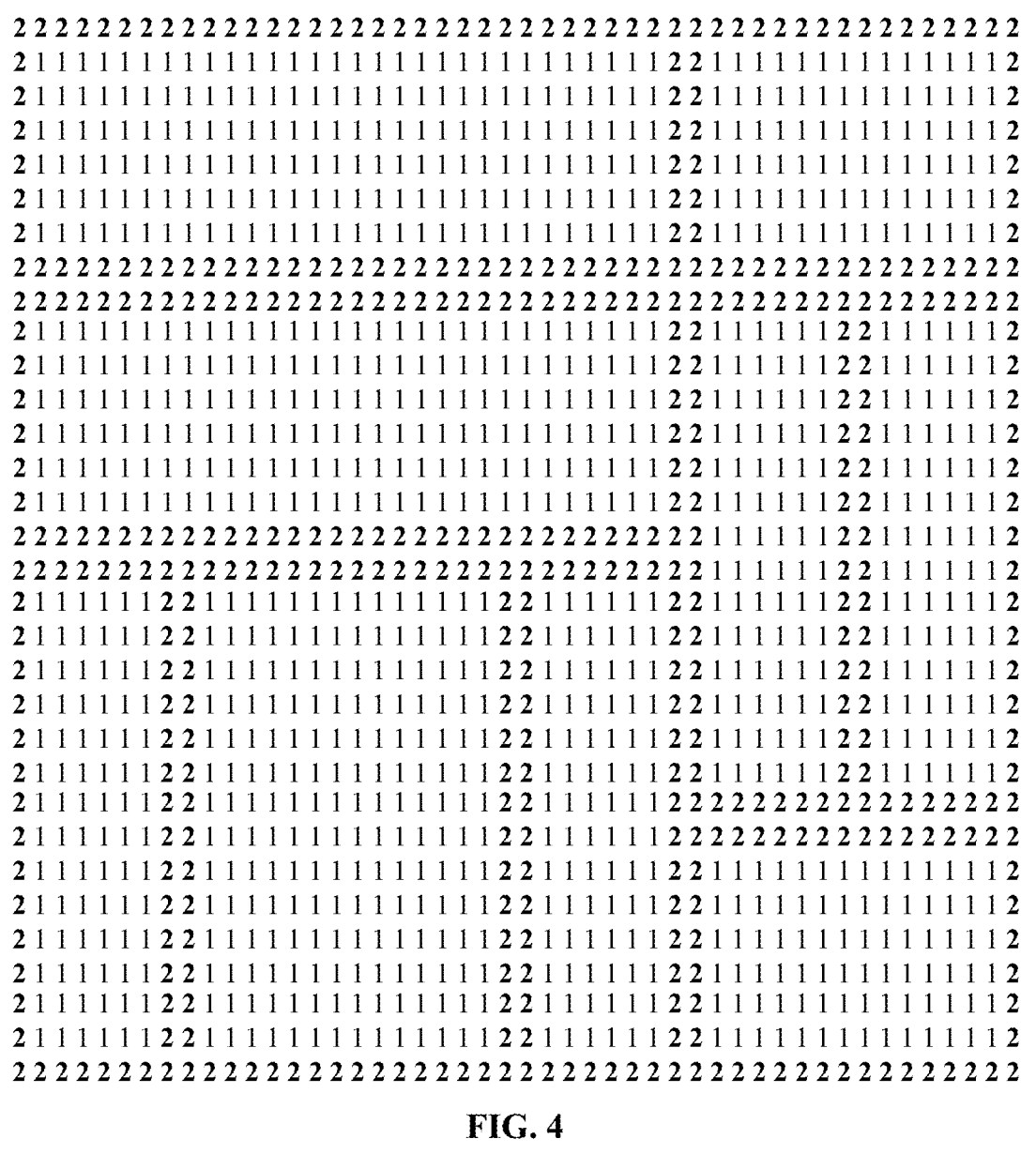

Specifically, the CU partitioning information may be converted a Coding Unit Map (CUmap), represented by a two-dimensional matrix, i.e., a CUmap matrix, namely the first matrix in the embodiment of the disclosure. That is, the original picture may be partitioned into multiple CUs. Each pixel position corresponding to the boundary of each CU may be filled with the first value, and the other pixel position may be filled with the second value. In such a manner, the first matrix reflecting the CU partitioning information may be constructed. For example, referring to FIG. 4, a structure diagram of a block partitioning matrix according to an embodiment of the disclosure is shown. As shown in FIG. 4, when the figure represents a CTU, the CTU may be partitioned into 9 CUs. When the first value is set to be 2 and the second value is set to be 1, each pixel position corresponding to a boundary of each CU is filled with 2, and other pixel positions are filled with 1. That is, the pixel position filled with 2 represents the boundary of the CU. Therefore, the CU partitioning information, i.e., the auxiliary information corresponding to the picture to be filtered, may be determined.

In some embodiments, the operation that the auxiliary information corresponding to the picture to be filtered is determined may include the following operation.

A QP corresponding to the original picture in the video to be coded is acquired, and the QP is determined as the QP information corresponding to the picture to be filtered.

Furthermore, in some embodiments, the operation that the QP is determined as the QP information corresponding to the picture to be filtered may include the following operations.

A second matrix the same as the original picture in size is established, each pixel position in the second matrix being filled with a normalized value of the QP corresponding to the original picture.

The second matrix is determined as the QP information corresponding to the picture to be filtered.

It is to be noted that distortion degrees of pictures to be filtered corresponding to different QPs are different. When the QP information is fused, a filter network may be adaptively endowed with a capability of processing any QP in a training process.

In the embodiment of the disclosure, the QP information may also be used as the auxiliary information to assist in filtering processing of the picture to be filtered. That is, in the video coding process of the original picture in the video to be coded, the QP information may be fully utilized and fused with at least two colour components of the picture to be filtered to guide filtering. Normalization processing may be performed on the QP information, and non-normalization processing (for example, classification processing and interval partitioning processing) may also be performed on the QP information. Detailed descriptions will be made below with QP normalization processing as an example.

Specifically, the QP information may be converted into the second matrix representing the QP information. That is, taking the original picture as an example, a matrix the same as the original picture in size is established, each pixel position in the matrix being filled with the normalized value of the QP corresponding to the original picture. The normalized value of the QP is represented by $QP_{max}(x,y)$, namely:

$$QP_{max}(x, y) = \frac{QP}{QP_{max}}, \quad (1)$$
$$x = 0, 1, \ldots, H-1; y = 0, 1, \ldots, W-1.$$

In the formula (1), QP represents a QP value corresponding to the original picture, x represents an abscissa value of each pixel position in the CU block, y represents an ordinate value of each pixel position in the CU block, and $QP_{max}$ represents a maximum value of the QP. Generally, a value of $QP_{max}$ is 51, but $QP_{max}$ may also be another value such as 29 and 31. No specific limits are made in the embodiment of the disclosure.

In some embodiments, the improved in-loop filter may include a CNN filter.

It is to be noted that the improved in-loop filter is configured to implement in-loop filtering of the picture to be filtered. The improved in-loop filter may be a CNN filter or may also be another filter constructed by deep learning. No specific limits are made in the embodiments of the disclosure. Herein, the CNN filter is a feedforward neural network including convolution calculation and with a deep structure and is one of representative algorithms of deep learning. An input layer of the CNN filter may process multidimensional data, for example, three colour component (Y/U/V) channels of the original picture in the video to be coded.

Figure 5:
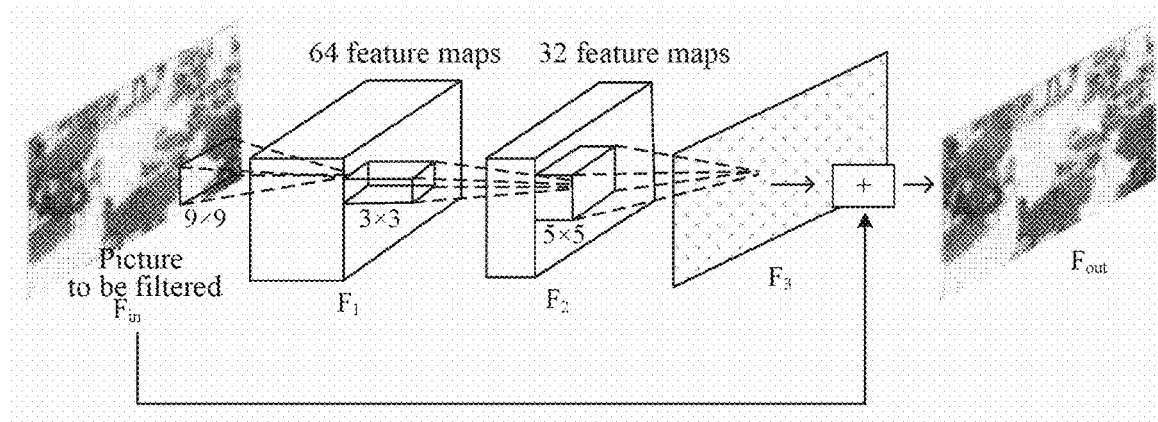
FIG. 5 is a composition structure diagram of a conventional CNN filter according to an embodiment of the disclosure.

Referring to FIG. 5, a composition structure diagram of a conventional CNN filter 50 according to an embodiment of the disclosure is shown. As shown in FIG. 5, the conventional CNN filter 50 is improved based on a last-generation video coding standard H.265/High Efficiency Video Coding (HEVC), and includes two layers of convolutional network structures capable of replacing the DBF and the SAO filter. The picture to be filtered (represented by $F_{in}$), after being input to the input layer of the CNN filter 50, may be sequentially processed through a first-layer convolutional network $F_1$ (there is made such a hypothesis that a size of a convolution kernel is 3×3 and 64 feature maps are included) and a second-layer convolutional network $F_2$ (there is made such a hypothesis that a size of a convolution kernel is 5×5 and 32 feature maps are included) to obtain residual information $F_3$. Then, a summation operation may be executed on the picture to be filtered $F_{in}$ and the residual information $F_3$ to finally obtain a filtered picture (represented by $F_{out}$) output by the conventional CNN filter 50. The convolutional network structure, also called a residual neural network, is configured to output the residual information corresponding to the picture to be filtered. In the conventional CNN filter 50, the three colour components (Y/U/V) of the picture to be filtered may be processed independently, but the same filter network and a related parameter of the filter network may be shared.

Figure 6A:
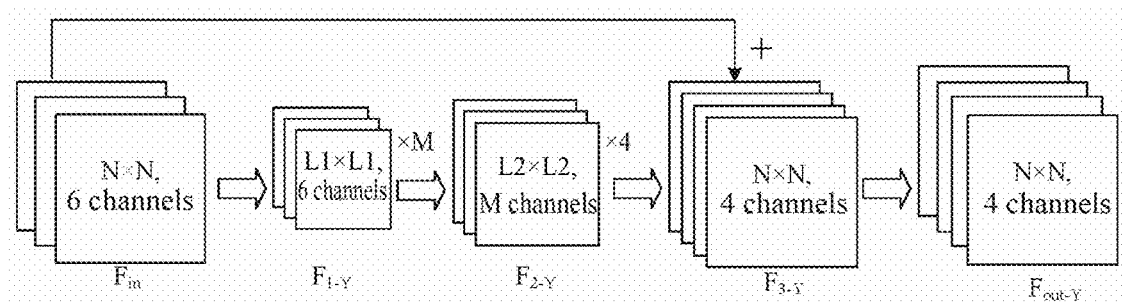
FIG. 6A and FIG. 6B are composition structure diagrams of another conventional CNN filter according to an embodiment of the disclosure.
Figure 6B:
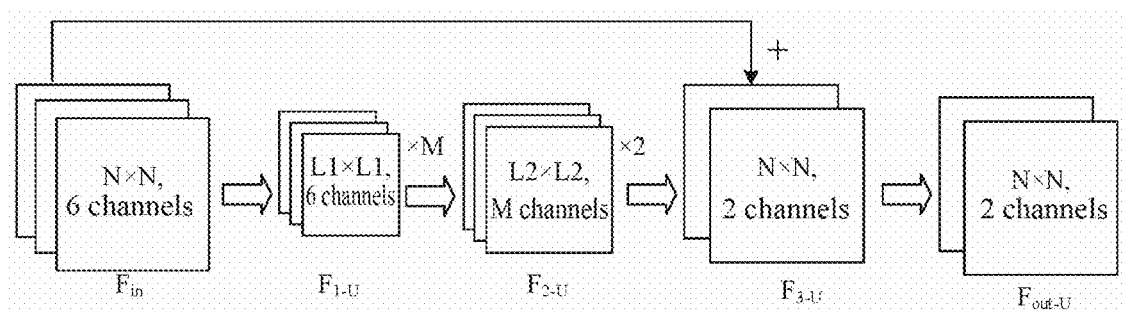

Referring to FIG. 6A and FIG. 6B, composition structure diagrams of another conventional CNN filter 60 according to an embodiment of the disclosure are shown. The conventional CNN filter 60 adopts two filter networks. The filter network shown in FIG. 6A is dedicated to outputting the first colour component, and the filter network shown in FIG. 6B is dedicated to outputting the second colour component or the third colour component. When the height of the original picture in the video to be coded is H and the width is W, the size information corresponding to the first colour component is H×W, and pixel rearrangement may be performed on the first colour component to convert the original picture into the form of $$\frac{H}{2} \times \frac{W}{2} \times 4.$$

Since the size information corresponding to the second colour component or the third colour component is $$\frac{H}{2} \times \frac{W}{2},$$

the three colour components may be merged to convert the original picture into the form of $$\frac{H}{2} \times \frac{W}{2} \times 6$$

for inputting to the conventional CNN filter 60. Based on the filter network shown in FIG. 6A, the picture to be filtered $F_{in}$ (there is made such a hypothesis that a size of a convolution kernel is N×N and the number of channels is 6), after being received by an input-layer network, may be sequentially processed through a first-layer convolutional network $F_{1-Y}$ (there is made such a hypothesis that a size of a convolution kernel is L1×L1, the number of convolution kernels is M and the number of channels is 6) and a second-layer convolutional network $F_{2-Y}$ (there is made such a hypothesis that a size of a convolution kernel is L2×L2, the number of convolution kernels is 4 and the number of channels is M) to obtain residual information $F_{3-Y}$ (there is made such a hypothesis that a size of a convolution kernel is N×N and the number of channels is 4), and then a summation operation may be executed on the input picture to be filtered $F_{in}$ and the residual information $F_{3-Y}$ to finally obtain a first filtered colour component (represented by $F_{out-Y}$) output by the conventional CNN filter 60. Based on the filter network shown in FIG. 6B, the picture to be filtered $F_{in}$, after being received by an input-layer network (there is made such a hypothesis that a size of a convolution kernel is N×N and the number of channels is 6), may be sequentially processed through a first-layer convolutional network $F_{1-U}$ (there is made such a hypothesis that a size of a convolution kernel is L1×L1, the number of convolution kernels is M and the number of channels is 6) and a second-layer convolutional network $F_{2-U}$ (there is made such a hypothesis that a size of a convolution kernel is L2×L2, the number of convolution kernels is 2 and the number of channels is M) to obtain residual information $F_{3-U}$ (there is made such a hypothesis that a size of a convolution kernel is N×N and the number of channels is 2), and then a summation operation may be executed on the input picture to be filtered $F_{in}$ and the residual information $F_{3-U}$ to finally obtain a second filtered colour component or third filtered colour component (represented by $F_{out-U}$) output by the conventional CNN filter 60.

For the conventional CNN filter 50 shown in FIG. 5 or the conventional CNN filter 60 shown in FIG. 6A and FIG. 6B, a relationship between different colour components is not considered, and it is not so reasonable to process each colour component independently. In addition, the coding parameter such as the block partitioning information and the QP information is not fully utilized at an input end, but a distortion of a reconstructed picture is mainly caused by a blocking effect, and boundary information of the blocking effect is determined by the CU partitioning information. That is, the filter network in the CNN filter should focus on a boundary region. Moreover, fusing the QP information into the filter network also can help improve the generalization capability thereof to enable the filter network to filter a distorted picture with any quality. Therefore, according to the method for in-loop filtering provided in the embodiment of the disclosure, not only is a CNN filtering structure set reasonably to ensure that the same filter network may simultaneously receive multiple colour components, but also a relationship between the multiple colour components is fully considered to ensure that enhanced pictures of these colour components may further be simultaneously output after filtering processing. In addition, according to the method for in-loop filtering, the coding parameter such as the block partitioning information and/or the QP information may also be fused as the auxiliary information to assist in filtering, so that the filtering quality is improved.

In some embodiments, the operation that the fused information of the picture to be filtered is determined may include the following operation.

The at least two colour components of the picture to be filtered may be fused with the corresponding auxiliary information to obtain the fused information of the picture to be filtered.

It is to be noted that, for the fused information in the embodiment of the disclosure, the fused information may be obtained by fusing the auxiliary information with the first colour component, second colour component and third colour component of the picture to be filtered, or the fused information may be obtained by fusing the auxiliary information with the first colour component and second colour component of the picture to be filtered, or the fused information may be obtained by fusing the auxiliary information with the first colour component and third colour component of the picture to be filtered, or the fused information may even be obtained by fusing the auxiliary information with the second colour component and third colour component of the picture to be filtered. No specific limits are made in the embodiment of the disclosure. It is also to be noted that the operation that "the at least two colour components of the picture to be filtered is fused with the corresponding auxiliary information" may be implemented by fusing the at least two colour components of the picture to be filtered at first and then fusing the auxiliary information, or may be implemented by fusing each colour component in the at least two colour components of the picture to be filtered and the corresponding auxiliary information respectively and then fusing the at least two processed colour components. That is, a specific manner for fusion processing is also not specifically limited in the embodiment of the disclosure.

In addition, the operation in the embodiment of the disclosure that "in-loop filtering is performed on the picture to be filtered based on the fused information to obtain the at least one filtered colour component of the picture to be filtered" is specifically as follows. After multiple colour components (for example, the first colour component, the second colour component and the third colour component) of the picture to be filtered are fused with the auxiliary information for inputting to the filter network, only the first filtered colour component, or second filtered colour component or third filtered colour component of the picture to be filtered may be output, or the first filtered colour component and second filtered colour component of the picture to be filtered may be output, or the second filtered colour component and the third filtered colour component may be output, or the first filtered colour component, second filtered colour component and third filtered colour component of the picture to be filtered may even be output. No specific limits are made in the embodiment of the disclosure.

Figure 7:
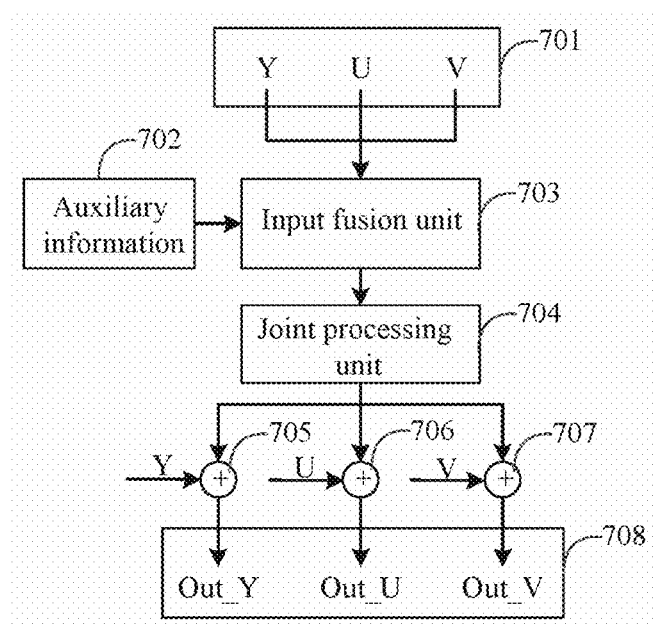
FIG. 7 is a composition structure diagram of an in-loop filtering framework according to an embodiment of the disclosure.

For example, the three colour components of the picture to be filtered are simultaneously input to the filter network. Referring to FIG. 7, a composition structure diagram of an in-loop filtering framework 70 according to an embodiment of the disclosure is shown. As shown in FIG. 7, the in-loop filtering framework 70 may include three colour components (represented by Y, U and V respectively) 701 of a picture to be filtered, auxiliary information 702, an input fusion unit 703, a joint processing unit 704, a first adder 705, a second adder 706, a third adder 707 and three filtered colour components (represented by Out_Y, Out_U and Out_V respectively) 708. The input fusion unit 703, the joint processing unit 704, the first adder 705, the second adder 706 and the third adder 707 form the improved in-loop filter in the embodiment of the disclosure. The input fusion unit 703 is configured to fuse the three colour components 701 of the picture to be filtered and the auxiliary information 702 for inputting to the joint processing unit 704. The joint processing unit 704 may include multiple layers of convolutional filter networks, and is configured to perform convolution calculation on input information. A specific convolution calculation process is similar to a related technical solution, and thus steps specifically executed by the joint processing unit 704 will not be described. After processing of the joint processing unit 704, residual information of the colour component Y, residual information of the colour component U and residual information of the colour component V may be obtained respectively. The colour component Y in the three colour components 701 of the picture to be filtered and the obtained residual information of the colour component Y may be input to the first adder 705 together, and an output of the first adder 705 may be the filtered colour component Y (represented by Out_Y). The colour component U in the three colour components 701 of the picture to be filtered and the obtained residual information of the colour component U may be input to the second adder 706 together, and an output of the second adder 706 is the filtered colour component U (represented by Out_U). The colour component V in the three colour components 701 of the picture to be filtered and the obtained residual information of the colour component V may be input to the third adder 707 together, and an output of the third adder 707 is the filtered colour component V (represented by Out_V). Herein, for component outputting, when only the filtered colour component Y is required to be output, the in-loop filtering framework 70 may not include the second adder 706 and the third adder 707; when only the filtered colour component U is required to be output, the in-loop filtering framework 70 may not include the first adder 705 and the third adder 707; and when the filtered colour component Y and the filtered colour component U are required to be output, the in-loop filtering framework 70 may not include the third adder 707. No specific limits are made in the embodiment of the disclosure.

Figure 8:
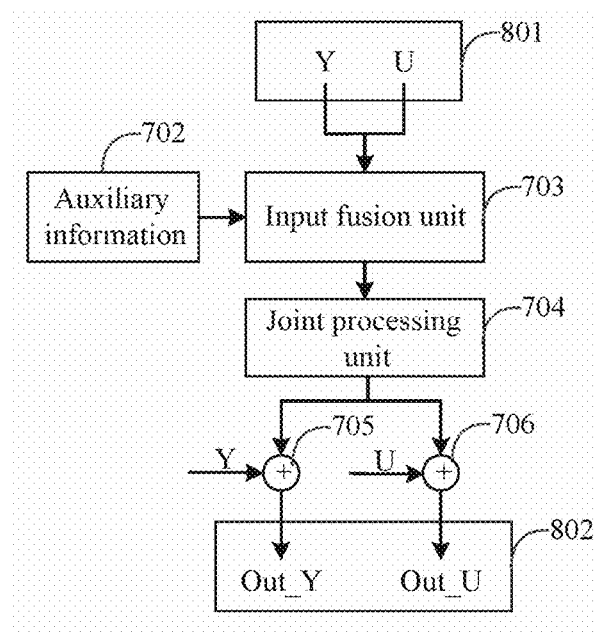
FIG. 8 is a composition structure diagram of another in-loop filtering framework according to an embodiment of the disclosure.

For example, two colour components of the picture to be filtered may be simultaneously input to the filter network. Referring to FIG. 8, a composition structure diagram of another in-loop filtering framework 80 according to an embodiment of the disclosure is shown. As shown in FIG. 8, the in-loop filtering framework 80 includes two colour components (represented by Y and U respectively) 801 of a picture to be filtered, the auxiliary information 702, the input fusion unit 703, the joint processing unit 704, the first adder 705, the second adder 706 and two filtered colour components (represented by Out_Y and Out_U respectively) 802. The difference from the in-loop filtering framework 70 shown in FIG. 7 is that the in-loop filtering framework 80 fuses the two colour components 801 of the picture to be filtered and the auxiliary information 702 for inputting to the joint processing unit 704. After processing of the joint processing unit 704, the residual information of the colour component Y and the residual information of the colour component U may be obtained respectively. The colour component Y in the two colour components 801 of the picture to be filtered and the obtained residual information of the colour component Y may be input to the first adder 705 together, and the output of the first adder 705 is the filtered colour component Y (represented by Out_Y). The colour component U in the two colour components 801 of the picture to be filtered and the obtained residual information of the colour component U may be input to the second adder 706 together, and the output of the second adder 706 is the filtered colour component U (represented by Out_U). Herein, for component outputting, when only the filtered colour component Y is required to be output, the in-loop filtering framework 70 may not include the second adder 706; and when only the filtered colour component U is required to be output, the in-loop filtering framework 70 may not include the first adder 705. No specific limits are made in the embodiment of the disclosure. It is to be noted that, when filtering processing of only one colour component of the picture to be filtered is considered at one time, fusion between multiple colour components is not required to be considered, like the filtering processing manner of the conventional CNN filter in a related technical solution. Elaborations are omitted in the embodiment of the disclosure.

The in-loop filtering framework 70 shown in FIG. 7 is taken as an example. A deep learning network (for example, a CNN) is adopted for in-loop filtering. The difference from the conventional CNN filter is that the improved in-loop filter in the embodiment of the disclosure may simultaneously input three colour components of a picture to be filtered to the filter network, also fuses other auxiliary information related to coding (for example, the coding parameter like the block partitioning information, the QP information and the MV information) and inputs all the information to the filter network at one time after fusion. In such a manner, not only the relationship between the three colour components is fully utilized, but also the other auxiliary information related to coding is adopted to assist in filtering, so that the filtering quality is improved. In addition, the three colour components are simultaneously processed, so that the problem that complete network forward calculation is required to be performed on the three colour components for three times is also effectively solved, the calculation complexity and the coding rate is reduced. For example, based on VTM3.0, it is found in an experimental test that, compared with the related technical solution, the method for in-loop filtering according to the embodiment of the disclosure has the advantage that a bit rate drop of 6.4% for the colour component Y, a bit rate drop of 9.8% for the colour component U and a bit rate drop of 11.6% for the colour component V may be simultaneously achieved on the premise of the same recovered video quality, so that the coding rate is reduced.

The embodiment provides the method for in-loop filtering. A picture to be filtered is acquired, the picture to be filtered being generated in a video coding process of an original picture in a video to be coded. Fused information of the picture to be filtered is determined, the fused information being obtained by fusing at least two colour components of the picture to be filtered and corresponding auxiliary information. In-loop filtering is performed on the picture to be filtered based on the fused information to obtain at least one filtered colour component of the picture subjected to the in-loop filtering. In such a manner, a coding parameter, such as block partitioning information and/or QP information, may be used as the auxiliary information to fuse with multiple input colour components, so that not only a relationship between the multiple colour components is fully utilized, but also the calculation complexity and the coding rate are reduced. In addition, the subjective and objective quality of a reconstructed picture in a video coding and decoding process is further improved.

Figure 9:
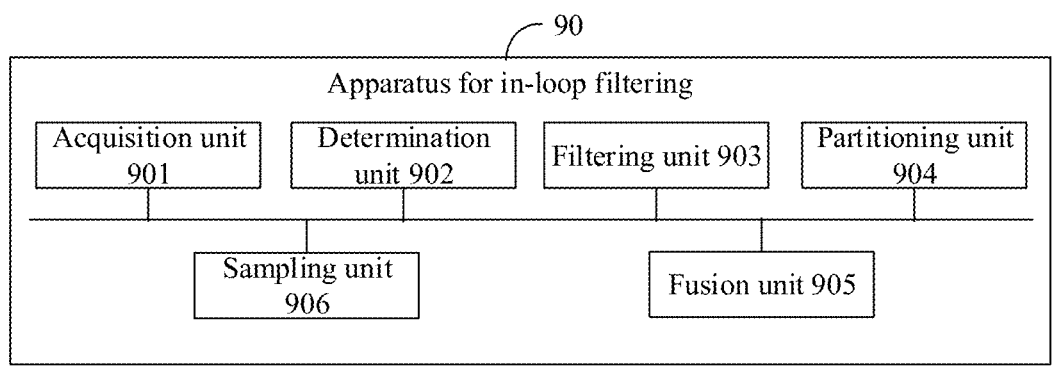
FIG. 9 is a composition structure diagram of an apparatus for in-loop filtering according to an embodiment of the disclosure.

Based on the same inventive concept of the abovementioned embodiment, referring to FIG. 9, a composition structure diagram of an apparatus 90 for in-loop filtering according to an embodiment of the disclosure is shown. The apparatus 90 for in-loop filtering may include an acquisition unit 901, a determination unit 902 and a filtering unit 903.

The acquisition unit 901 is configured to acquire a picture to be filtered, the picture to be filtered being generated in a video coding process of an original picture in a video to be coded, the video to be coded including at least one original picture and the at least one original picture including the original picture.

The determination unit 902 is configured to determine fused information of the picture to be filtered, the fused information being obtained by fusing at least two colour components of the picture to be filtered and corresponding auxiliary information.

The filtering unit 903 is configured to perform in-loop filtering on the picture to be filtered based on the fused information to obtain at least one colour component of the picture subjected to the in-loop filtering.

In the solution, the acquisition unit 901 is specifically configured to perform video coding on the original picture in the video to be coded and determine a generated reconstructed picture as the picture to be filtered; or, the acquisition unit 901 is specifically configured to perform video coding on the original picture in the video to be coded to generate a reconstructed picture, perform preset filtering on the reconstructed picture and determine the reconstructed picture subjected to the preset filtering as the picture to be filtered.

In the solution, the determination unit 902 is further configured to determine the auxiliary information corresponding to the picture to be filtered, the auxiliary information at least including block partitioning information and/or QP information.

In the solution, referring to FIG. 9, the apparatus for in-loop filtering 90 further includes a partitioning unit 904, configured to perform CU partitioning on the original picture in the video to be coded to obtain CU partitioning information and determine the CU partitioning information as the block partitioning information corresponding to the picture to be filtered.

In the solution, the determination unit 902 is specifically configured to obtain a first matrix corresponding to the CU partitioning information by filling each pixel position corresponding to a boundary of a CU with a first value and filling another pixel position with a second value, the first value being different from the second value, and determine the first matrix as the block partitioning information corresponding to the picture to be filtered.

In the solution, the acquisition unit 901 is further configured to acquire a QP corresponding to the original picture in the video to be coded and determine the QP as the QP information corresponding to the picture to be filtered.

In the solution, the determination unit 902 is specifically configured to establish a second matrix the same as the original picture in size, each pixel position in the second matrix being filled with a normalized value of the QP corresponding to the original picture, and determine the second matrix as the QP information corresponding to the picture to be filtered.

In the solution, referring to FIG. 9, the apparatus for in-loop filtering 90 further includes a fusion unit 905, configured to fuse the at least two colour components of the picture to be filtered and the corresponding auxiliary information to obtain the fused information of the picture to be filtered.

In the solution, referring to FIG. 9, the apparatus for in-loop filtering 90 further includes a sampling unit 906, configured to select a low-resolution colour component from the at least two colour components of the picture to be filtered and perform up-sampling processing on the low-resolution colour component.

It can be understood that, in the embodiment, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer storage medium, which stores an in-loop filtering implementation program. The in-loop filtering implementation program is executed by at least one processor to implement the steps of the method as described in the abovementioned embodiment.

Figure 10:
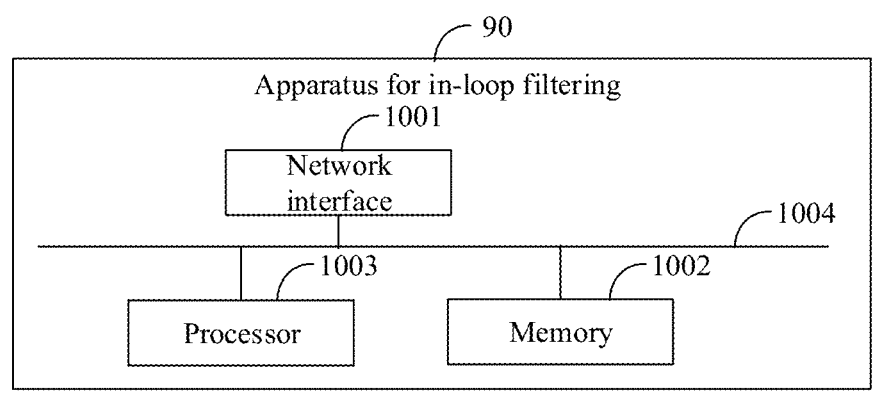
FIG. 10 is a specific hardware structure diagram of an apparatus for in-loop filtering according to an embodiment of the disclosure.

Based on the composition of the apparatus 90 for in-loop filtering and the computer storage medium, referring to FIG. 10, a specific hardware structure example of the apparatus 90 for in-loop filtering according to an embodiment of the disclosure is shown, which may include a network interface 1001, a memory 1002 and a processor 1003. Each component is coupled together through a bus system 1004. It can be understood that the bus system 1004 is configured to implement connection communication between these components. The bus system 1004 includes a data bus and further includes a power bus, a control bus and a state signal bus. However, for clear description, various buses in FIG. 10 are marked as the bus system 1004. The network interface 1001 is configured to receive and send a signal in a process of receiving and sending information with another external network element.

The memory 1002 is configured to store a computer program capable of running in the processor 1003.

The processor 1003 is configured to run the computer program to execute the following operations.

A picture to be filtered is acquired, the picture to be filtered being generated in a video coding process of an original picture in a video to be coded, the video to be coded including at least one original picture and the at least one original picture including the original picture.

Fused information of the picture to be filtered is determined, the fused information being obtained by fusing at least two colour components of the picture to be filtered and corresponding auxiliary information.

In-loop filtering is performed on the picture to be filtered based on the fused information to obtain at least one colour component of the picture subjected to the in-loop filtering.

It can be understood that the memory 1002 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the memory 1002 of a system and method described herein is intended to include, but not limited to, memories of these and any other proper types.

The processor 1003 may be an integrated circuit chip with a signal processing capability. In an implementation process, each step of the method may be completed by an integrated logic circuit of hardware in the processor 1003 or an instruction in a software form. The processor 1003 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, step and logical block diagram disclosed in the embodiments of the disclosure may be implemented or executed. The universal processor may be a microprocessor or the processor may also be any conventional processor, etc. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the memory 1002. The processor 1003 reads information in the memory 1002 and completes the steps of the method in combination with hardware.

It can be understood that these embodiments described herein may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, other electronic units configured to execute the functions in the disclosure or combinations thereof.

In case of implementation with the software, the technology described herein may be implemented through the modules (for example, processes and functions) executing the functions described herein. A software code may be stored in the memory and executed by the processor. The memory may be implemented in the processor or outside the processor.

Optionally, as another embodiment, the processor 1003 is further configured to run the computer program to execute the steps of the method in the abovementioned embodiments.

It is to be noted that the technical solutions recorded in the embodiments of the disclosure may be freely combined without conflicts.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

In the embodiments of the disclosure, a picture to be filtered is acquired, the picture to be filtered being generated in a video coding process of an original picture in a video to be coded. Then, fused information of the picture to be filtered is determined, the fused information being obtained by fusing at least two colour components of the picture to be filtered and corresponding auxiliary information. Finally, in-loop filtering is performed on the picture to be filtered based on the fused information to obtain the at least one filtered colour component of the picture to be filtered. In such a manner, a coding parameter, such as block partitioning information and/or QP information, may be used as the auxiliary information to fuse with multiple input colour components, so that not only a relationship between the multiple colour components is fully utilized, but also complete network forward calculation required to be performed for the multiple colour components is effectively avoided, the calculation complexity and the coding rate are reduced. In addition, the auxiliary information such as the block partitioning information and/or the QP information is fused, so that filtering may further be assisted, and the subjective and objective quality of a reconstructed picture in the video coding and decoding process is improved.

The invention claimed is:

1. A method for in-loop filtering, comprising:
   acquiring a picture to be filtered, the picture to be filtered being generated in a process of coding an original picture in a video to be coded;
   determining auxiliary information corresponding to the picture to be filtered, the auxiliary information at least comprising block partitioning information, the block partitioning information comprising a block size and a block position;
   determining fused information of the picture to be filtered based on the auxiliary information including a coding parameter and prediction direction information, the fused information being obtained by fusing at least two colour components of the picture to be filtered and corresponding auxiliary information; and
   acquiring an in-loop filtering output of the picture to be filtered based on the fused information, wherein the in-loop filtering output comprises at least one colour component,
   wherein determining the auxiliary information corresponding to the picture to be filtered comprises:
   acquiring a QP corresponding to the original picture in the video to be coded, and determining the QP as the QP information corresponding to the picture to be filtered.

2. The method of claim 1, wherein acquiring the picture to be filtered comprises:
   performing video coding on the original picture in the video to be coded, and determining a generated reconstructed picture as the picture to be filtered.

3. The method of claim 2, wherein video coding is performed on the original picture in the video to be coded to generate a reconstructed picture, preset filtering is performed on the reconstructed picture, and the reconstructed picture subjected to the preset filtering is determined as the picture to be filtered.

4. The method of claim 1, wherein determining the QP as the QP information corresponding to the picture to be filtered comprises:
   establishing a matrix the same as the original picture in size, each pixel position in the matrix being filled with a normalized value of the QP corresponding to the original picture; and
   determining the matrix as the QP information corresponding to the picture to be filtered.

5. An apparatus for in-loop filtering, comprising a memory and a processor, wherein
   the memory is configured to store a computer program capable of running in the processor; and
   the processor is configured to:
   acquire a picture to be filtered, the picture to be filtered being generated in a process of coding an original picture in a video to be coded;
   determine auxiliary information corresponding to the picture to be filtered, the auxiliary information at least comprising block partitioning information, the block partitioning information comprising a block size and a block position;

determine fused information of the picture to be filtered based on the auxiliary information including a coding parameter and prediction direction information, the fused information being obtained by fusing at least two colour components of the picture to be filtered and corresponding auxiliary information; and acquire an in-loop filtering output of the picture to be filtered based on the fused information, wherein the in-loop filtering output comprises at least one colour component, wherein the processor is further configured to acquire a QP corresponding to the original picture in the video to be coded and determine the QP as the QP information corresponding to the picture to be filtered.

6. The apparatus of claim 5, wherein the processor is specifically configured to:

perform video coding on the original picture in the video to be coded and determine a generated reconstructed picture as the picture to be filtered.

7. The apparatus of claim 6, wherein the processor is further configured to:

perform video coding on the original picture in the video to be coded to generate a reconstructed picture, perform preset filtering on the reconstructed picture and determine the reconstructed picture subjected to the preset filtering as the picture to be filtered.

8. The apparatus of claim 5, wherein the processor is specifically configured to establish a matrix the same as the original picture in size, each pixel position in the second matrix being filled with a normalized value of the QP corresponding to the original picture, and determine the second matrix as the QP information corresponding to the picture to be filtered.

9. A method for in-loop filtering, comprising:

decoding a bitstream to determine a picture to be filtered;

determining auxiliary information corresponding to the picture to be filtered, the auxiliary information at least comprising block partitioning information, the block partitioning information comprising a block size and a block position;

determining fused information of the picture to be filtered based on the auxiliary information including a coding parameter and prediction direction information, the fused information being obtained by fusing at least two colour components of the picture to be filtered and corresponding auxiliary information; and acquiring an in-loop filtering output of the picture to be filtered based on the fused information, wherein the in-loop filtering output comprises at least one colour component, wherein determining the auxiliary information corresponding to the picture to be filtered comprises:

acquiring a QP corresponding to the original picture in the video to be coded, and determining the QP as the QP information corresponding to the picture to be filtered.

10. The method of claim 9, wherein decoding the bitstream to determine the picture to be filtered comprises:

decoding the bitstream to determine a reconstructed picture as the picture to be filtered.

11. The method of claim 10, wherein the bitstream is decoded to generate the reconstructed picture, preset filtering is performed on the reconstructed picture, and the reconstructed picture subjected to the preset filtering is determined as the picture to be filtered.

12. An apparatus for in-loop filtering, comprising a memory and a processor, wherein the memory is configured to store a computer program capable of running in the processor; and the processor is configured to:

decode a bitstream to determine a picture to be filtered;

determining auxiliary information corresponding to the picture to be filtered, the auxiliary information at least comprising block partitioning information, the block partitioning information comprising a block size and a block position;

determine fused information of the picture to be filtered based on the auxiliary information including a coding parameter and prediction direction information, the fused information being obtained by fusing at least two colour components of the picture to be filtered and corresponding auxiliary information; and acquire an in-loop filtering output of the picture to be filtered based on the fused information, wherein the in-loop filtering output comprises at least one colour component, wherein the processor is further configured to acquire a QP corresponding to the original picture in the video to be coded and determine the QP as the QP information corresponding to the picture to be filtered.

13. The apparatus of claim 12, wherein the processor is further configured to:

decode the bitstream to determine a reconstructed picture as the picture to be filtered.

14. The apparatus of claim 13, wherein the bitstream is decoded to generate the reconstructed picture, preset filtering is performed on the reconstructed picture, and the reconstructed picture subjected to the preset filtering is determined as the picture to be filtered.

* * * * *